(12) United States Patent
Perrin et al.

(10) Patent No.: US 10,051,196 B2
(45) Date of Patent: Aug. 14, 2018

(54) PROJECTING LIGHT AT ANGLE CORRESPONDING TO THE FIELD OF VIEW OF A CAMERA

(71) Applicant: Lenovo (Singapore) Pte. Ltd., New Tech Park (SG)

(72) Inventors: Steven Richard Perrin, Raleigh, NC (US); John Weldon Nicholson, Cary, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 606 days.

(21) Appl. No.: 14/282,349

(22) Filed: May 20, 2014

(65) Prior Publication Data

US 2015/0341551 A1   Nov. 26, 2015

(51) Int. Cl.
*H04N 5/232* (2006.01)
*H04N 5/235* (2006.01)
*H04N 5/225* (2006.01)

(52) U.S. Cl.
CPC ......... *H04N 5/2354* (2013.01); *H04N 5/2256* (2013.01); *H04N 5/23216* (2013.01); *H04N 5/23293* (2013.01)

(58) Field of Classification Search
CPC ............. H04N 5/23238; H04N 5/2354; H04N 5/2256; H04N 5/23216; H04N 5/23293
USPC ......................................................... 348/169
See application file for complete search history.

(56) References Cited

U.S. PATENT DOCUMENTS

| | | | |
|---|---|---|---|
| 8,502,864 B1* | 8/2013 | Watkins | G03B 35/00 348/52 |
| 2002/0195496 A1* | 12/2002 | Tsikos | B82Y 15/00 235/462.01 |
| 2008/0128506 A1* | 6/2008 | Tsikos | G06K 7/10732 235/462.42 |
| 2008/0128508 A1* | 6/2008 | Tsikos | G06K 7/10732 235/462.42 |
| 2008/0131111 A1* | 6/2008 | Messina | G01N 21/8806 396/351 |
| 2008/0185262 A1* | 8/2008 | Dunlop | G07D 11/0021 194/207 |
| 2008/0277473 A1* | 11/2008 | Kotlarsky | G06K 7/10722 235/462.07 |
| 2009/0001163 A1* | 1/2009 | Barkan | G06K 7/10722 235/454 |
| 2013/0021491 A1* | 1/2013 | Lee | H04N 19/56 348/222.1 |
| 2014/0118483 A1* | 5/2014 | Rapoport | H04N 5/23258 348/36 |
| 2014/0267818 A1* | 9/2014 | Perlman | G01T 1/295 348/222.1 |
| 2015/0281530 A1* | 10/2015 | Kessler | G03B 17/565 348/373 |

* cited by examiner

*Primary Examiner* — Andy Rao
*Assistant Examiner* — Zaihan Jiang
(74) *Attorney, Agent, or Firm* — John L. Rogitz; John M. Rogitz (57) ABSTRACT

In one aspect, a device includes a camera, a processor, and a memory accessible to the processor. The memory bears instructions executable by the processor to initiate the camera and project light from the device at an angle corresponding to a field of view of the camera according to a current focal length of the camera.

20 Claims, 6 Drawing Sheets

PROJECTING LIGHT AT ANGLE CORRESPONDING TO THE FIELD OF VIEW OF A CAMERA

FIELD

The present application relates generally to projecting light at an angle corresponding to the field of view of a camera.

BACKGROUND

When taking a picture or video using a camera on a device such as e.g. a wearable device, it may be difficult to determine what portions of a subject area will end up in the image owing to it being impractical, unfeasible, and/or too costly to one or both of embed on the device a viewfinder on which to "preview" the potential image, and/or include an adequate display on the device to "preview" the potential image. However, it is still desirable to ascertain what will end up being included in an image gathered by a camera in such a device despite not being able to preview the potential image on e.g. a touch-enabled display screen.

SUMMARY

Accordingly, in one aspect a device includes a camera, a processor, and a memory accessible to the processor. The memory bears instructions executable by the processor to initiate the camera and project light from the device at an angle corresponding to a field of view of the camera according to a current focal length of the camera.

In another aspect, a method includes initiating a camera on a device and projecting light from the device at an angle framing the field of view of the camera according to a current focal length of the camera.

In still another aspect, a device includes a camera, a processor, and a memory accessible to the processor. The memory bears instructions executable by the processor to project light from the device at an angle framing the purview of the camera according to a current focal length of the camera, where the light is not projected from a display screen of the device.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/ or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
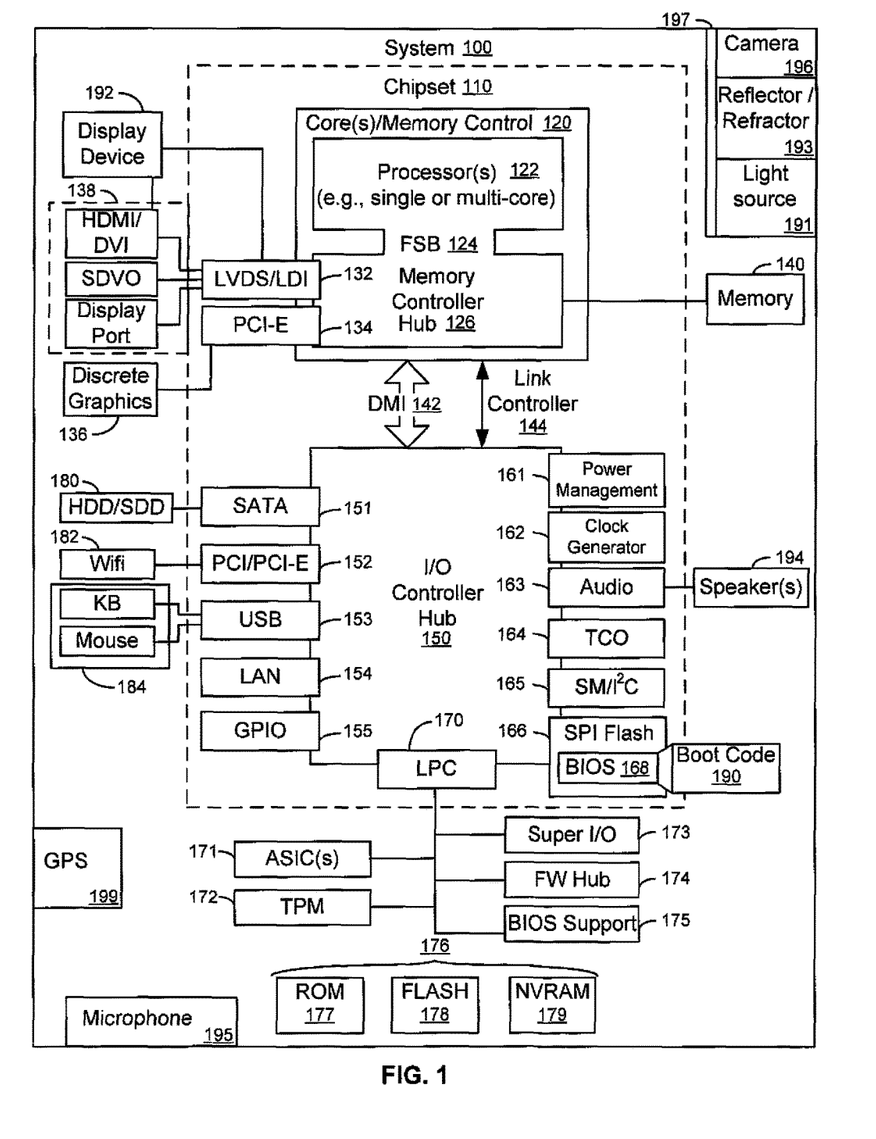
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video.

Even further, the system 100 includes at least one light source 191 and at least one reflecting or refracting element 193 for reflecting or refracting light from the light source 191. Note that the light source may be, but is not limited to, e.g. one or more light emitting diodes (LEDs) and/or one or more laser diodes (LDs). Also, note that the reflecting or refracting element 193 may be e.g. a mirror (e.g. a microelectromechanical systems (MEMS) mirror), a prism, and/or a lens. FIG. 1 also shows at least one perforation 197 (e.g. a slit) in the housing of the system 100, and/or in the camera 196 specifically, through which light may travel such as e.g. light from the light source 191.

Still in reference to FIG. 1, a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
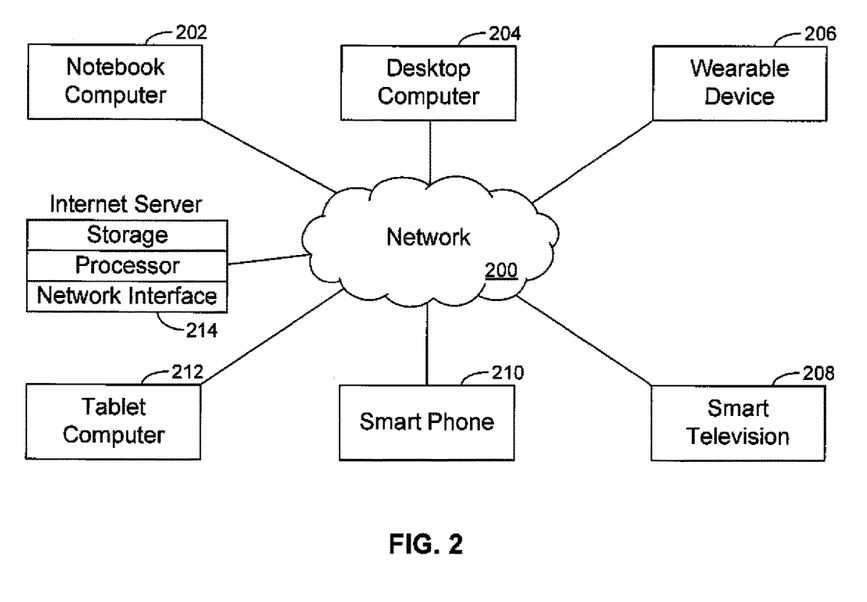
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
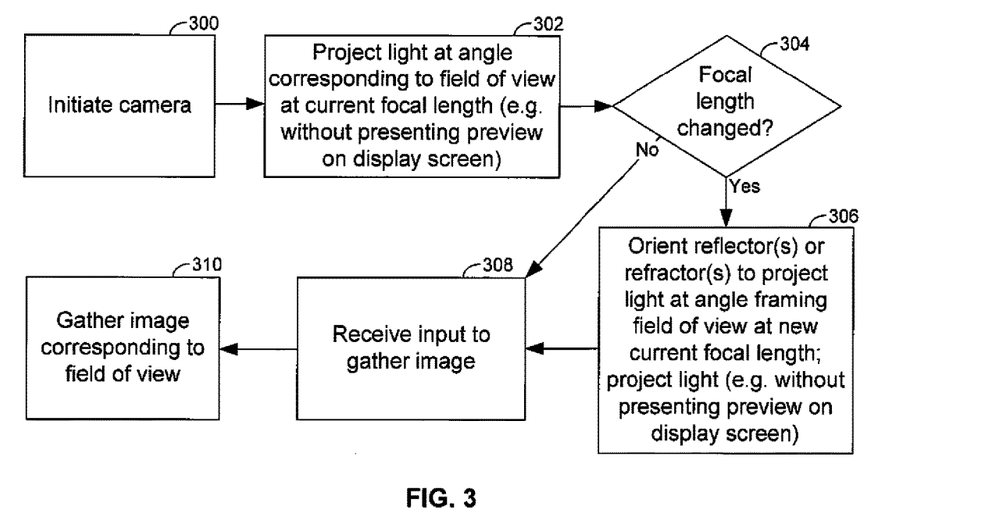
FIGS. 3 and 4 are flow charts showing example algorithms in accordance with present principles.

Referring to FIG. 3, it shows example logic that may be undertaken by a device such as the system 100 in accordance with present principles. Beginning at block 300, the logic initiates a camera on a device undertaking the logic of FIG. 3 (referred to below as the "present device"). From block 300 the logic proceeds to block 302 where the logic projects light from the present device at an angle corresponding to a field of view of the camera according to its current focal length, whether that be e.g. a fixed focal length or merely the current focal length based on the camera's current configuration. In any case, it is to be understood that at block 302 the logic may project light in accordance with present principles without presenting an image preview or other image data in e.g. a viewfinder presented on a display screen of the present device.

After block 302 the logic proceeds to decision diamond 304, at which the logic determines whether the focal length for the camera has changed (e.g. based on user input such as e.g. operating a zoom in or out function for the camera). A negative determination at diamond 304 causes the logic to move directly to block 308, which will be discussed shortly. However, note that an affirmative determination causes the logic to proceed to block 306. At block 306 the logic orients one or more reflectors (e.g. MEMs mirrors) and/or refractors (e.g. prisms and/or one or more lenses for the camera) to project light at an angle framing the field of view of the camera at its new focal length subsequent to the change determined at diamond 304, and then projects light accordingly. Note that at block 306 the logic may project light in accordance with present principles without presenting an image preview or other image data in e.g. a viewfinder presented on a display screen of the present device.

Reference is now made to block 308, which may be arrived at either based on a negative determination at diamond 304 or by proceeding from block 306. In any case, at block 308 the logic receives input from a user to gather an image using the camera, and then at block 310 the logic actuates the camera to gather an image corresponding to the current field of view of the camera.

Figure 4:
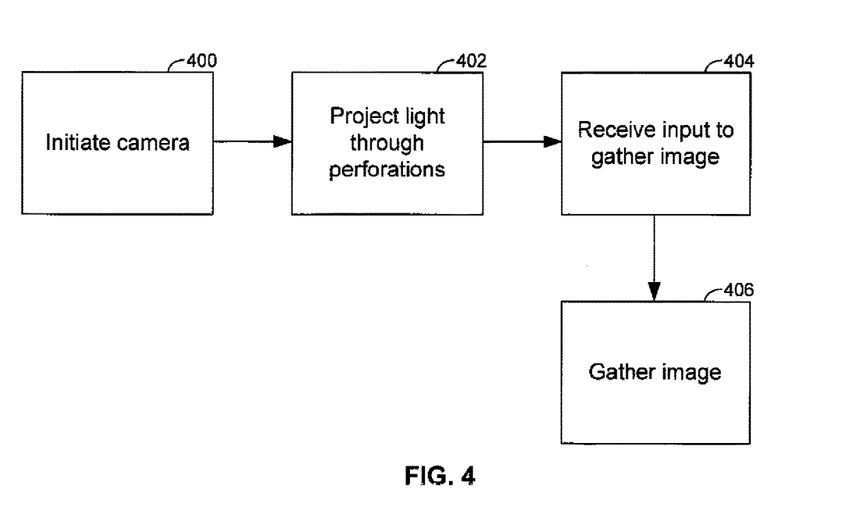

Now in reference to FIG. 4, it shows example logic that may be undertaken by a device such as the system 100 in accordance with present principles. The logic of FIG. 4 may be undertaken by itself, and/or in combination with the logic of FIG. 3. In any case, at block 400 the logic initiates a camera on a device undertaking the logic of FIG. 4 (referred to below as the "present device"). From block 400 the logic proceeds to block 402 where the logic projects light from the present device through perforations (e.g. slits) in one or both of a housing of the present device and/or the camera specifically to thus provide a framing of the camera's field of view e.g. at its current and/or fixed focal length. From block 402 the logic proceeds to block 404 where the logic receives input from a user to gather an image using the camera, and then at block 406 the logic actuates the camera to gather an image corresponding to the e.g. fixed field of view of the camera. Before moving on to the description of FIG. 5, it is to be understood that in some embodiments light may be projected according to the logic of FIG. 4 without presenting an image preview or other image data in e.g. a viewfinder presented on a display screen of the present device.

Figure 5:
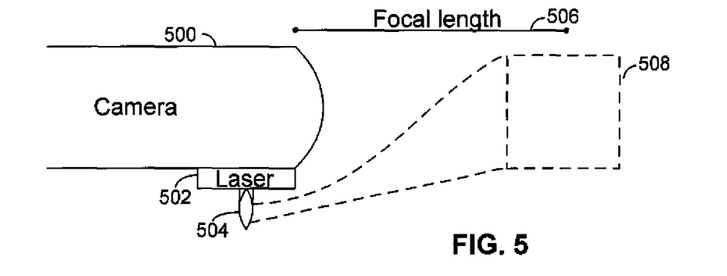
FIGS. 5-8, 10 and 11 are example illustrations of present principles.

Reference is now made to FIG. 5, which is an illustration of a device including a camera 500 in accordance with present principles. As shown in FIG. 5, at least one laser diode (LD) 502 is shown, along with a mirror 504. The device may configure (e.g. orient) the mirror 504 to reflect light from the LD(s) at an angle which frames the field of view of the camera according to the current focal length 506 as represented by the rectangular light frame 508. It is to be understood that the representations of light described in reference to FIGS. 5-8, including e.g. the frame 508, are illustrative and are shown in these figures as would appear when light is projected onto a flat surface e.g. with the camera's viewing angle being orthogonal to such a surface.

Figure 6:
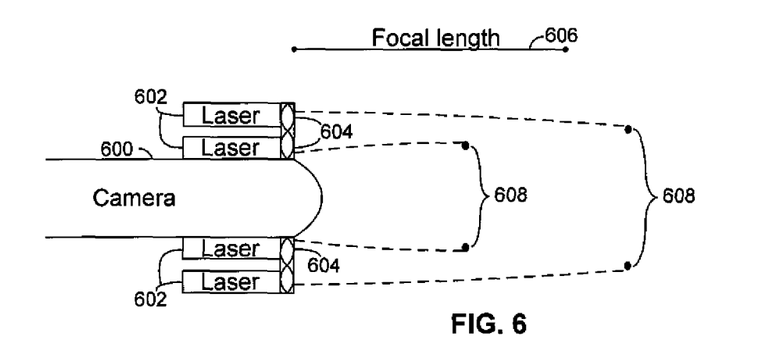

In any case, before moving on to the description of FIG. 6, it is to also be understood that the device having the camera 500 is configured to, using the mirror 504, vary the angle at which the light is emitted as the focal length of the lens changes (e.g. based on manipulation of a zoom feature for the camera).

Continuing the detailed description now in reference to FIG. 6, it shows an illustration of a device including a camera 600 in accordance with present principles. As shown in FIG. 6, four LDs 602 are shown, along with four prisms 604 respectively arranged to each direct light from one of the plural LDs 602 in accordance with present principles. The device may configure (e.g. orient) the prisms 602 to refract light from the LD(s) at angles which frame the field of view of the camera according to the current focal length 606 as represented by the four points 608 representing four respective corners of a boundary of the camera's current field of view. It is to be understood that in the example embodiment shown, each of the LDs 602 projects a beam of light through a prism 604 to establish one of the four points 608. Furthermore, it is to be understood that the device having the camera 600 is configured to, using the prisms 604, vary the respective angles at which light is emitted from the LDs 602 as the focal length of the lens changes.

It may now be appreciated based on FIG. 6 that LDs may be e.g. mounted in, on, and/or around the camera 600 so as to emit light, and that e.g. prisms 604 when at differing orientations relative to each other refract light from an LD to illuminate specific points in the camera's view such as e.g. the four points 608 representing corners of a rectangular field of view. The orientation of the prisms 604 may be altered by the device as the focal length of the camera's lens changes.

Figure 7:
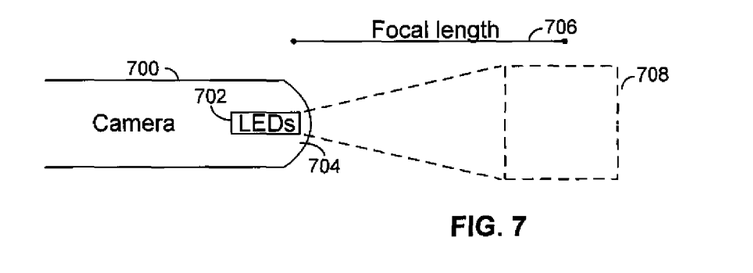

Moving on to the description of FIG. 7, it shows an illustration of a device including a camera 700 in accordance with present principles. As shown in FIG. 7, at least one light emitting diode (LED) 702 is shown as being juxtaposed around and/or inside the camera 700 to direct light through at least one lens 704 of the camera 700. It is to be understood that the device including the camera 700 is configured to direct light from the LED 702 through the lens 704 at an angle which frames the field of view of the camera 700 according to the current focal length 706. Thus, in example embodiments the lens 704, as the focal length changes, is oriented so as to refract light from the LED(s) 702 at angles which frame the field of view of the camera as represented by the rectangular representation 708 of the field of view according to the current focal length. The representation 708 thus corresponds to the boundary of the field of view of the camera 700 according to the current focal length in this example. It may now be appreciated based on FIG. 7 that LEDs may be placed in and around the camera itself, and that light from the LEDs may be focused by the camera's lens e.g. onto a surface and/or toward a subject that will be in focus. Accordingly, the representation 708 permits a user to view an outline of a potential image should the camera be actuated to gather an image at its current position and focal length.

Figure 8:
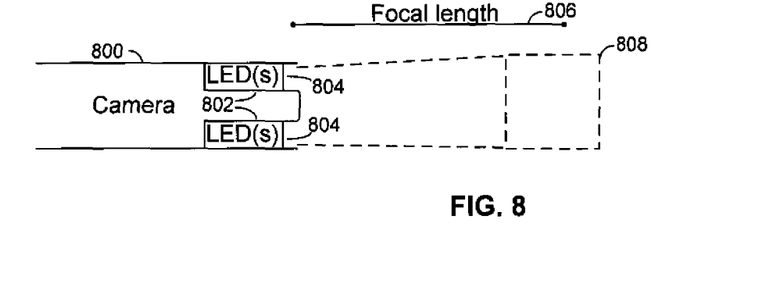

Now in reference to FIG. 8, it shows an illustration of a device including a camera 800 in accordance with present principles. FIG. 8 also shows at least one LED 802 as being juxtaposed around and/or inside a portion of the device, and even e.g. a portion of the camera 800 itself to direct light through at least one perforation, slit, hole, and/or aperture 804. The perforations 804 are understood to be configured to direct light from the LED(s) 802 outwardly from the device and/or camera 800 at angles corresponding to the field of view of the camera 800 per e.g. a fixed focal length 806. Thus, it is to be understood that upon emission of light from the LED(s) 802 the perforations 804 allow light from the LEDs) 802 to pass therethrough to frame the field of view of the camera 800 as represented by the rectangular representation 808 of the field of view according to the fixed focal length.

It may now be appreciated based on FIG. 8 that LEDs may be placed e.g. inside the housing and/or body of the camera 800 e.g. around the lens of the camera, and that light from the LEDs 802 may be directed through the slits and/or perforations 804 onto an object that will be the subject of a picture. Accordingly, the representation 808 permits a user to view an outline of a potential image should the camera be actuated to gather an image at its current position and focal length owing to each perforation 804 being configured at an angle corresponding to at least a portion of the field of view of the camera per e.g. a fixed focal length of the camera. The LEDs 802 may thus direct light outwardly of the camera 800 through the perforations 804 to create a pattern such as the representation 808 which can be seen by the user.

Figure 9:
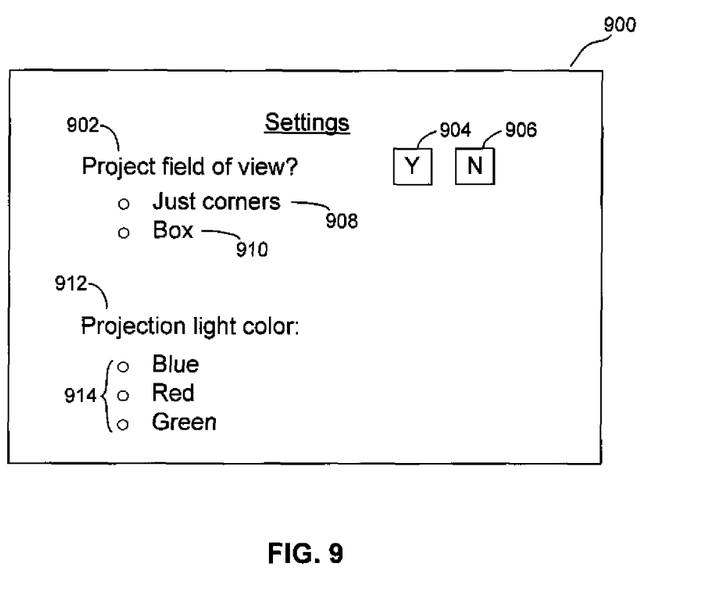
FIG. 9 is an example user interface (UI) in accordance with present principles.

Turning now to FIG. 9, it shows an example settings user interface (UI) 900 that may be presented on the display of a device such as the system 100. Additionally, it is to be understood that the UI 900 may be presented on a device in communication with e.g. an image-taking device such as e.g. a wearable device that may not itself have an adequate display for presentation of the UI 900, or any display at all.

In any case, the UI 900 includes a first setting 902 for configuring the image-gathering device to project a field of view indicator and/or representation in accordance with present principles. Thus, a yes selector element 904 is shown for automatically without further user input responsive thereto configuring the present device to project a field of view representation when e.g. a camera on the device is initiated. Note that selection of the no selector element 906 is also shown for configuring the device to decline to present the representation.

In addition to the foregoing, e.g. and based on selection of the yes selector element 904, options 908 and 910 may be presented for selection by a user. Option 908 is selectable (e.g. using the respective radio button shown) to automatically without further user input responsive thereto configure the device to present an indicator framing the field of view of the camera at its current focal length by projecting light to represent the corners of the rectangle of the camera's field of view. Option 910 is selectable (e.g. using the respective radio button shown) to automatically without further user input responsive thereto configure the device to present an indicator framing the field of view of the camera at its current focal length by projecting light to represent an outline of the field of view (e.g. a box representing the boundaries of the field of view).

Still further, the UI 900 also includes a second setting 912 for configuring the camera to project light of a certain color automatically without further user input responsive to selection of at least one of plural options 914. Thus, the options 914 may include colors such as e.g. blue light, red light, and green light for selection by a user to thus configure the image-taking device to emit light of the selected color.

Figure 10:
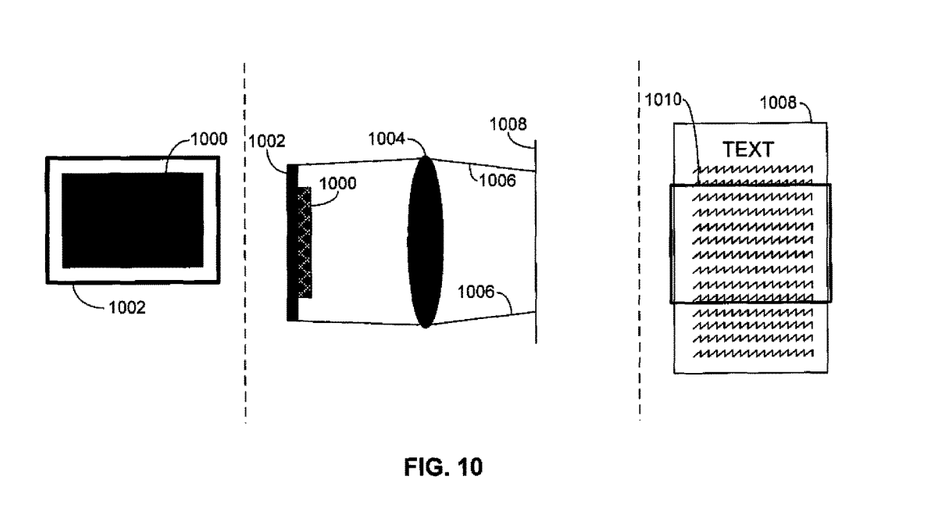
Figure 11:
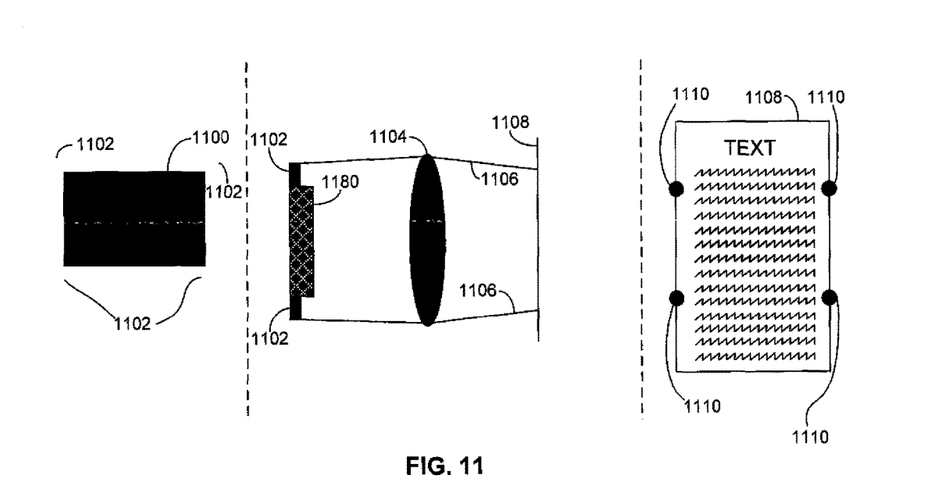

Now describing FIGS. 10 and 11, they show additional example illustrations in accordance with present principles. Jointly describing these figures, the first (e.g., left-most) panes of FIGS. 10 and 11 show cross-sectional views of respective camera sensors 1000 and 1100 of cameras, along with respective LED arrays 1002 and 1102. As may be appreciated from the first respective panes of FIGS. 10 and 11, the array 1002 at least substantially surrounds (e.g. one or more peripheries of) the sensor 1000, while the array 1102 includes plural LEDs respectively arranged e.g. at corners of the camera sensor 1100.

The respective second (e.g. middle) panes of FIGS. 10 and 11 show respective side views of the sensors 1000 and 1100 and arrays 1002 and 1102. These views also show respective lenses 1004 and 1104 of their cameras projecting respective LED patterns corresponding to their respective camera's field of view via light beams 1006 and 1106 from the LEDs 1002 and 1102 onto respective surfaces 1008 and 1108 such as e.g. respective documents for which images are to be gathered. As may be appreciated from the respective third (e.g. right-most) panes of FIGS. 10 and 11, when light beams 1006 and 1106 from the LED arrays 1002 and 1102 are projected onto the respective documents 1008 and 1108, respective patterns 1010 and 1110 corresponding to the respective fields of view of the cameras of FIGS. 10 and 11 are shown as being projected onto the documents 1008 and 1108.

Without reference to any particular figure it is to be understood that a user may e.g. control the intensity of the light sources described herein so that light may be projected to a desired distance according to e.g. an object and/or scene of which the user desires to take a picture. Furthermore, it is to be understood that the device may e.g. automatically responsive to initiation of the camera and without further user input determine the distance from the camera to at least one object (e.g. the nearest object or the farthest object) in the camera's (e.g. detectable) field of view and then adjust the intensity of the light emitted by e.g. the LDs and/or LEDs to thus be projected at least to the object at the determined distance.

Still without reference to any particular figure, it is to be understood that digital zooming may be used in accordance with present principles. E.g., a device including a camera may control the reflectors and/or refractors disclosed herein to project light from the device at an angle corresponding to the field of view of the camera according to the current focal length per the digital zoom rather than e.g. the current actual focal length of the camera.

Moreover, note that as indicated above, the algorithms described herein (e.g. the algorithm of FIG. 3) are understood to be examples. Thus, it is to be understood in accordance with present principles that a user may adjust the focus and/or zoom of a camera, and the logic may determine as much and in response adjust the projected light accordingly to correspond to the new field of view. The device may then wait for the user to take a picture and/or periodically determine whether input has been received to take a picture. Further, e.g., based on a determination that input has not been received to take a picture, the logic may revert back to an earlier portion thereof and determine again whether the user is changing the focus and/or zoom of the camera and then proceed accordingly. The same applies to e.g. turning the camera on and/or proceeding after at least one picture has been taken, mutatis mutandis. E.g., subsequent to a power on and/or after taking a picture, the algorithm may determine if the focus and/or zoom of the camera has been changed (e.g. by the user) and hence determine whether light being projected in accordance with present principles should be adjusted accordingly to correspond to the new field of view.

Furthermore, note that in addition to the reflectors and refractors disclosed herein, diffraction grating may be used in accordance with present principles to direct light from a light source. Also note that other sources of light besides LEDs and LDs may be used in accordance with present principles.

Still further, it is to be understood that although the illustrations of FIGS. 5-8 show representations of fields of view of the respective cameras shown therein as being e.g. presented on a relatively flat surface, it is to be understood that light may be projected at e.g. oblique angles relative to a subject and/or object for which a picture or video is to be taken. In such cases and in some embodiments, the device may continue to project light as described in one or more of the examples above.

However, also in such cases but in other embodiments, e.g. the pattern of light being projected may be altered such as e.g. by projecting light at the device in the formation of a trapezoid rather than e.g. as a rectangle to thus cause the projected light to appear (e.g. relative to the device, and hence the user) at the subject and/or object to be imaged at least substantially as a rectangle corresponding to the field of view of the camera.

What's more, it is to be understood that in some embodiments the camera may be configured to detect, e.g. at the subject and/or object to be imaged, a trapezoid-shaped light projection that results at the subject and/or object even when e.g. a rectangular frame is or was being projected by the camera (e.g. such as may occur when projecting light from a camera obliquely relative to a surface to be imaged). In such embodiments, the device may be configured to detect potential distortion to an image to be gathered based on dimensions of the resulting trapezoid that are detected. Based thereon, the device may adjust image scaling across an image to be taken accordingly.

In addition to the foregoing, it is to be understood that in some embodiments, rather than e.g. projecting a framing and/or outline of a field of view of a camera, signals may be received by the camera device and at least a portion of (e.g. "preview") image(s) that would otherwise be presented e.g. on a viewfinder presented on a display screen of the device may instead be projected by LDs and/or LEDs onto a surface or other area located somewhere other than the device (e.g. and even an area larger than such a display) to thus aid a person to understand what is being imaged without presenting imaging information on a display screen of the device itself. Accordingly, the refractors and/or reflectors, logic, illustrations, and/or UI discussed herein may be used in conjunction with LDs and/or LEDs for such projections, mutatis mutandis.

Based on the foregoing detailed description, it may now be appreciated that the current application provides devices, systems, and methods for e.g. projecting light onto a scene that will be in a picture. The light may form a pattern which frames the camera's field of view. Light sources may be positioned at and/or next to the camera, thus making it is possible even without viewing a preview of the image on a display screen for a user to determine the field of view of the camera when the camera is directed at a scene and/or object(s) to thus determine the content that will appear in a picture if taken based on the outline and/or representation of the camera's field of view. This may be is useful e.g. at a relatively short range such as taking a picture of a document, but also at relatively longer ranges as well.

In addition, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave.

While the particular PROJECTING LIGHT AT ANGLE CORRESPONDING TO THE FIELD OF VIEW OF A CAMERA is herein shown and described in detail, it is to be understood that the subject matter which is encompassed by the present application is limited only by the claims.

What is claimed is:

1. A device, comprising:
   a camera;
   four laser diodes (LDs);
   four prisms respectively arranged to each direct light from one of the LDs;
   a processor; and
   storage accessible to the processor and comprising instructions executable by the processor to:
   initiate the camera; and
   project light from the device to correspond to a field of view per a zoom executed by the device using input from the camera, wherein the instructions are executable to orient the prisms to project light from the four LDs at angles which together frame the field of view per the zoom and which establish four beams of light corresponding to four corners of the field of view per the zoom.

2. The device of claim 1, comprising at least one mirror, wherein the instructions are executable by the processor to orient the at least one mirror to project light from at least one of the LDs at an angle which frames the field of view per the zoom.

3. The device of claim 2, wherein the mirror is a micro-electromechanical systems (MEMS) mirror.

4. The device of claim 1, comprising at least one light emitting diode (LED), wherein the instructions are executable by the processor to direct light from the LED through a lens of the camera at an angle which frames the field of view per the zoom.

5. The device of claim 4, wherein light is directed through the lens to establish a rectangular representation of the field of view per the zoom, and wherein the rectangular representation corresponds to the boundary of the field of view per the zoom.

6. The device of claim 1, wherein perforations that are at least one of at the camera and near the camera direct light from a light source outwardly from the device at one or more angles corresponding to the field of view per the zoom.

7. A method, comprising:
   initiating a camera on a device; and
   projecting light from four laser diodes (LD) through four respective prisms of the device at respective angles framing a field of view associated with a focal length of the camera, the projecting performed at least in part by moving the prisms to project light at the respective angles which together frame the field of view associated with the focal length and which establish respective beams of light corresponding to respective corners of the field of view associated with the focal length.

8. The method of claim 7, wherein the device further comprises a mirror controllable to direct light.

9. The method of claim 7, wherein light is projected from the device at least in part through a lens of the camera.

10. A device, comprising:
    a camera;
    four laser diodes (LDs);
    four prisms respectively arranged to each direct light from one of the LDs;
    a processor; and
    storage accessible to the processor and comprising instructions executable by the processor to:
    project light from the device to frame a field of view of the camera according to a focal length of the camera at least in part by moving the four prisms to project light from the four LDs at respective angles to establish respective beams of light corresponding to respective corners the field of view according to the focal length.

11. The device of claim 1, wherein the instructions are executable by the processor to:
    present, on a display, a user interface (UI) comprising a selector element that is selectable to configure the device to project light from the device at at least one angle corresponding to a field of view per zooming executed by the device using input from the camera.

12. The device of claim 11, wherein the selector element is a first selector element, and wherein the UI comprises a second selector element that is selectable to configure the device to decline to project light from the device at at least one angle corresponding to a field of view per zooming executed by the device using input from the camera.

13. The device of claim 1, wherein the instructions are executable by the processor to:
    present, on a display, a user interface (UI) comprising an option that is selectable to specify a particular color in which the device is to project light from the device at at least one angle corresponding to a field of view per zooming executed by the device using input from the camera.

14. The device of claim 1, wherein the instructions are executable by the processor to:
    present, on a display, a user interface (UI) comprising a first option that is selectable to configure the device to project light from the device to represent corners of a field of view per zooming executed by the device using input from the camera, the UI further comprising a second option that is selectable to configure the device to project light from the device in the form of a box to outline a field of view per zooming executed by the device using input from the camera.

15. The method of claim 7, comprising:
    presenting, on a display, a user interface (UI) comprising a selector element that is selectable to configure the device to project light from the device at at least one angle framing a field of view defined by zooming performed by the device based on input from the camera.

16. The method of claim 7, comprising:
    presenting, on a display, a user interface (UI) comprising an option that is selectable to specify a particular color in which light is to be projected from the device according to a field of view of the camera.

17. The method of claim 7, comprising:
    presenting, on a display, a user interface (UI) comprising a first option that is selectable to configure the device to project light from the device to represent corners of a field of view of the camera, the UI further comprising a second option that is selectable to configure the device to project light from the device in the form of a box to outline a field of view of the camera.

18. The device of claim 10, wherein the instructions are executable by the processor to:
    present, on a display, a user interface (UI) comprising a selector element that is selectable to enable the device to project light from the device according to a field of view of the camera.

19. The device of claim 10, wherein the instructions are executable by the processor to:
    present, on a display, a user interface (UI) comprising an option that is selectable to specify a particular color in which the device is to project light according to a field of view of the camera.

20. The device of claim 10, wherein the instructions are executable by the processor to:

present, on a display, a user interface (UI) comprising a first option that is selectable to configure the device to project light from the device to represent corners of a field of view of the camera, the UI further comprising a second option that is selectable to configure the device to project light from the device in the form of a box to outline a field of view of the camera.

* * * * *